(12) United States Patent
Ali et al.

(10) Patent No.: US 8,279,263 B2
(45) Date of Patent: Oct. 2, 2012

(54) MAPPING PSYCHO-VISUAL CHARACTERISTICS IN MEASURING SHARPNESS FEATURE AND BLURRING ARTIFACTS IN VIDEO STREAMS

(75) Inventors: Walid S. I. Ali, Sammamish, WA (US); Rony Ferzli, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 437 days.

(21) Appl. No.: 12/566,633

(22) Filed: Sep. 24, 2009

(65) Prior Publication Data
US 2011/0069142 A1    Mar. 24, 2011

(51) Int. Cl.
*H04N 7/14* (2006.01)
(52) U.S. Cl. ............... 348/14.12; 348/14.08; 348/14.01
(58) Field of Classification Search .... 348/14.01–14.16; 382/280, 286, 266, 173, 179, 209
See application file for complete search history.

(56) References Cited

U.S. PATENT DOCUMENTS

| 7,119,854 | B2 | 10/2006 | Dantwala | |
|---|---|---|---|---|
| 7,430,329 | B1 | 9/2008 | Sarna | |
| 2002/0036707 | A1* | 3/2002 | Gu | 348/497 |
| 2006/0147125 | A1* | 7/2006 | Caviedes | 382/266 |
| 2009/0116713 | A1 | 5/2009 | Yan et al. | |
| 2009/0141932 | A1* | 6/2009 | Jones et al. | 382/100 |
| 2009/0154807 | A1* | 6/2009 | Rossato et al. | 382/173 |
| 2009/0208140 | A1* | 8/2009 | Jayant et al. | 382/309 |
| 2009/0245689 | A1* | 10/2009 | Panetta et al. | 382/284 |

OTHER PUBLICATIONS

Shi, et al., "Blocking Effect Reduction Based on Human Visual System for Highly Compressed Images", Retrieved at <<http://ieeexplore.ieee.org/stamp/stamp.jsp?arnumber=04054563>, In the Proceedings of the Canadian Conference on Electrical and Computer Engineering, May 2006, pp. 1948-1951.
Ferzli, et al., "A No-Reference Objective Image Sharpness Metric Based on Just-Noticeable Blur and Probability Summation", Retrieved at <<http://ieeexplore.ieee.org/stamp/stamp.jsp?tp=&arnumber=4379342>> IEEE International Conference on Image Processing, vol. 3, Sep. 16-Oct. 19, 2007, pp. 445-448.
Yang, et al., "Perceptual Sharpness Metric (PSM) for Compressed Video", Retrieved at <<http://ieeexplore.ieee.org/stamp/stamp.jsp?arnumber=04036715>>, IEEE International Conference on Multimedia and Expo, Jul. 9-12, 2006, pp. 777-780.
Kong, et al., "Edge Map Guided Adaptive Post-Filter for Blocking and Ringing Artifacts Removal", Retrieved at <<http://www.merl.com/papers/docs/TR2004-003.pdf>>, TR-2004-003, Feb. 2004, also published in the Proceedings of the 2004 International Symposium on Circuits and Systems, vol. 3, May 23-26, 2004, pp. 6.
Ferzli, et al., "A Human Visual System-Based Model for Blur/Sharpness Perception", Retrieved at <<http://enpub.fulton.asu.edu/resp/vpqm2006/papers06/323.pdf>>, Second International Workshop on Video Processing and Quality Metrics for Consumer Electronics, 2006, pp. 4.

* cited by examiner

*Primary Examiner* — Melur Ramakrishnaiah
(74) *Attorney, Agent, or Firm* — Turk IP Law, LLC

(57) ABSTRACT

A block-based, no-reference sharpness metric is provided taking advantage of Human Visual System (HVS) characteristics. Texture and smooth region blocks are excluded in computing the metric since sharpness is perceived mostly around edges. Overall sharpness metric is computed by pooling simulated combination of information in human brain employing a logistic function to replicate the behavior of HVS.

19 Claims, 10 Drawing Sheets

MAPPING PSYCHO-VISUAL CHARACTERISTICS IN MEASURING SHARPNESS FEATURE AND BLURRING ARTIFACTS IN VIDEO STREAMS

BACKGROUND

Videoconferencing uses telecommunications of audio and video to bring people at different sites together for a meeting. This can be as simple as a conversation between two people in private offices (point-to-point) or involve several sites (multipoint) with more than one person in a number of rooms at different sites. Besides the audio and visual transmission of people, videoconferencing can be used to share documents, computer-displayed information, and whiteboards.

In video conferencing applications, many users may share the same channel. Due to channel sharing and limited bandwidth availability, video compression is performed using state of the art video encoding algorithms. To accommodate as many users as possible, an acquired video is typically highly compressed. Due to the compression, a decoded video tends to introduce visually annoying artifacts such as blurring, ringing, and blockiness. For example, the Human Visual System (HVS) exhibits a temporal lowpass filter behavior when exposed to content with motion and sharpness is perceived mostly around edges. Thus, metrics designed for specific artifacts may be employed to determine overall quality of the video objectively.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing a block-based, no-reference sharpness metric taking advantage of Human Visual System (HVS) characteristics. Texture and smooth region blocks may be excluded since sharpness is perceived mostly around edges. Overall sharpness metric according to some embodiments may be computed by pooling simulated combination of information in human brain.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
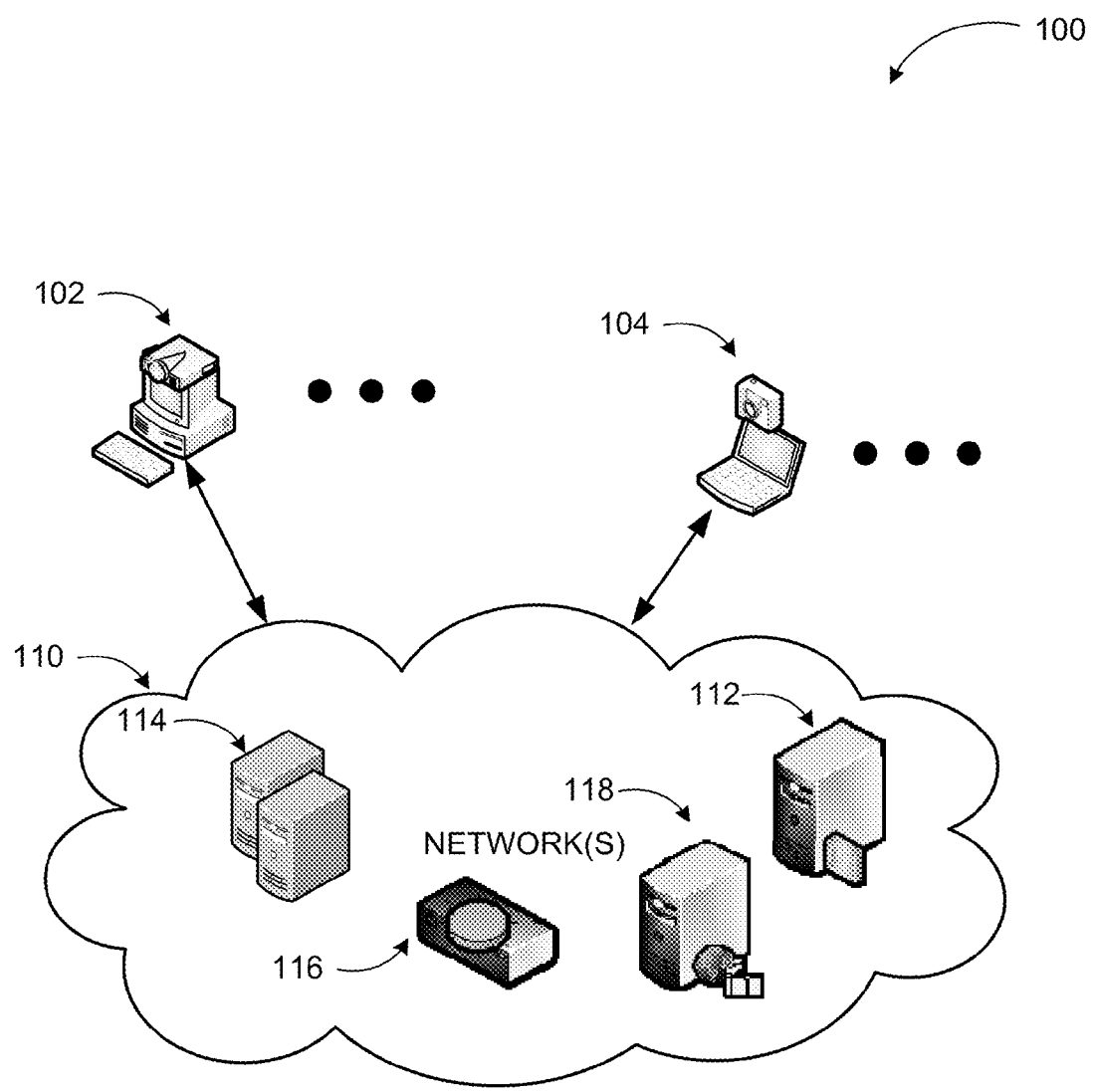
FIG. 1 is a diagram illustrating an example video conferencing system.

As briefly described above, a block-based no-reference metric may be employed to measure blurring artifacts in received video streams in order to enhance video quality. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media. The computer program product may also be a propagated signal on a carrier (e.g. a frequency or phase modulated signal) or medium readable by a computing system and encoding a computer program of instructions for executing a computer process.

Throughout this specification, the term "platform" may be a combination of software and hardware components for facilitating video conferences. Examples of platforms include, but are not limited to, a hosted service executed over a plurality of servers, an application executed on a single server, and comparable systems. The term "server" refers to a computing device executing one or more software programs typically in a networked environment. The term "client"

refers to a computing device or software application that provides a user access to data and other software applications through a network connection with other clients and/or servers. More detail on these technologies and example operations is provided below.

Referring to FIG. 1, diagram 100 of an example video conferencing system is illustrated. At the core of a video conferencing system is a network (e.g. network(s) 110) enabling a number of participants with audio/video transmission and reception capability to communicate with each other as a group. Participant devices 102, 104 may be any computing device with audio/video capability such as desktop or laptop computers with a camera and microphone (as well as a speaker), specialized video conferencing equipment, or even mobile devices with audio/video capabilities.

Network 110, as discussed in more detail below, may be any communication network or combination of networks. The video conference may be facilitated by a single device/program or by a combination of devices and programs. For example, audio/video server 118, firewall server 112, or mediation servers 114 may be involved with different aspects of the conference such as storage and processing of audio/video files, security, or interconnection of various networks for seamless communication. Any of these example tasks and others may be performed by software programs, hardware devices, and/or combination of the two.

According to one embodiment, MCU 116 may be the main facilitator of the video conference in coordination with one or more of the other devices and/or programs mentioned. MCU 116 may use various protocols such as Internet Protocol (IP), and be structured as software program(s), hardware, or combination of the two. MCU 116 may be a stand-alone hardware device, or it may be embedded into dedicated conferencing devices (e.g. audio/video server 118 or mediation servers 114). Furthermore, MCU 116 may be structured as a "decentralized multipoint", where each station in a multipoint call exchanges video and audio directly with the other stations with no central manager or other bottleneck.

As mentioned previously, an MCU controlled video conference may support receiving one video stream with fix resolution or receiving multiple video streams with different resolutions. MCU 116 may support, in addition to regular video conferences, multi-party conferences that escalate from a peer-to-peer chat through a mesh network.

Participants in the video conference such as the end devices and the MCU 116 may communicate also through Session Description Protocol (SDP), which is a format for describing streaming media initialization parameters. SDP is intended for describing multimedia sessions for the purposes of session announcement, session invitation, and other forms of multimedia session initiation. SDP does not provide the content of the media form itself but simply provides a negotiation between two end points to allow them to agree on a media type and format. This allows SDP to support upcoming media types and formats enabling systems based on this technology to be forward compatible.

Centralized Conferencing Control Protocol (CCCP) may also be employed to facilitate video conferences between the participants. CCCP uses a client-server model for creation, querying, and manipulation of conference system entities, conference objects, and sub-objects. By implementing a CCCP server, a means is provided for authorized CCCP clients (e.g. conference participants) to affect the behavior of a conference. CCCP is a semantic oriented protocol, which uses extensible markup language (XML) types defined in the conference data package for the representation of conference object and its sub-objects. Thus, the CCCP approach defines a set of semantics (e.g. add, get, set, delete, remove) that operate directly on the conference state elements.

By measuring the strength of visual artifacts in video conferencing applications, the metrics may be used to access automatically without human intervention the quality of the video frames and as a feedback parameter to the transmitter to increase, for example, the encoding bit rate or to modify the post processing algorithms at the decoder to adjust the filtering strength. The measurements of various degradations may later be combined to generate an overall objective quality metric, according to the perceptual impact of each one of the impairments.

Figure 2:
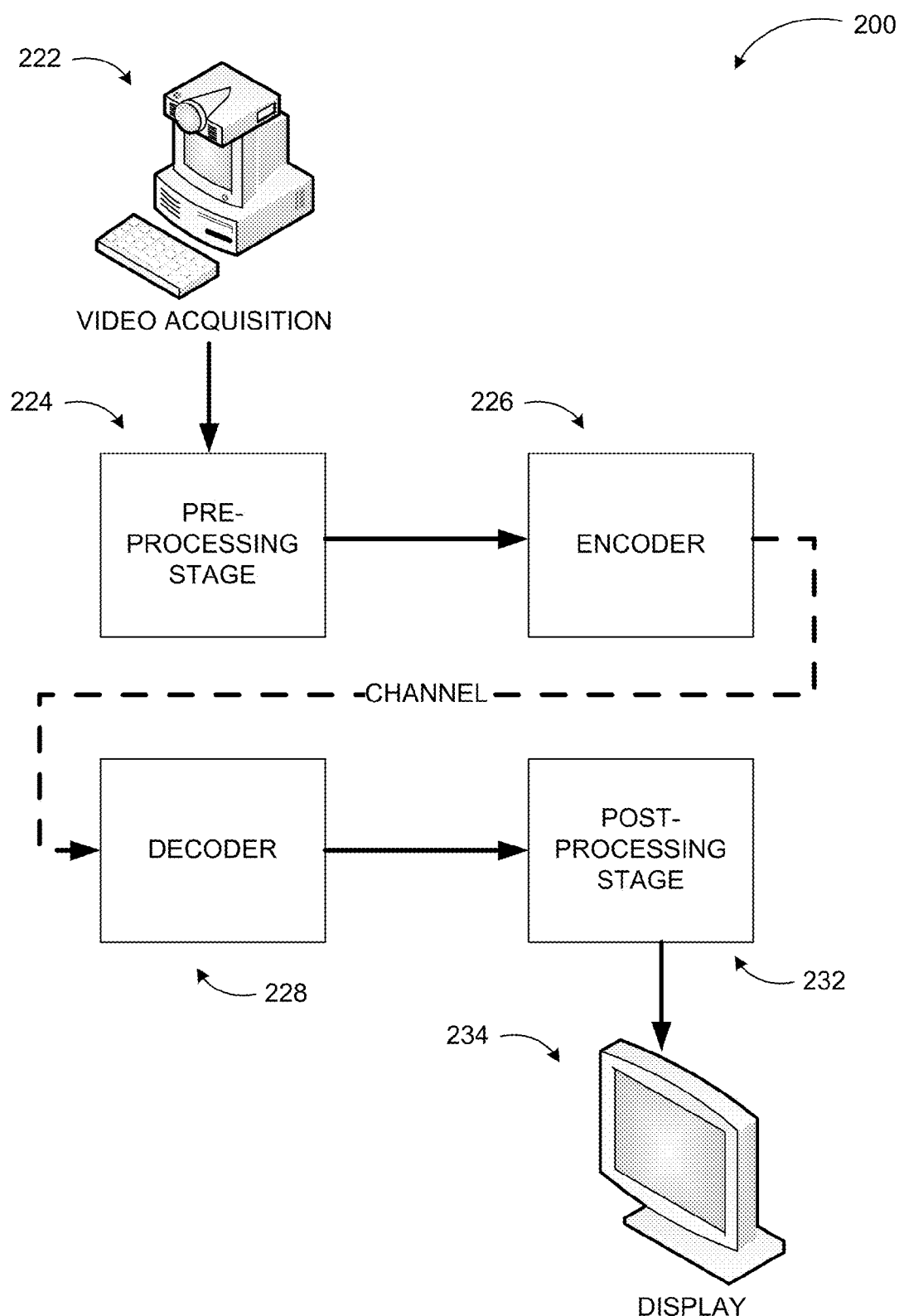
FIG. 2 illustrates major components in video exchange between participants of a video conferencing system.

FIG. 2 illustrates major components in video exchange between participants of a video conferencing system 200. A video conferencing system essentially captures video and audio from one or more sources, processes the signals, converts them to digital signals, transmits to one or more recipients, enables further processing of the digitized information at the recipient device(s), and enables presentation of the captured video and audio to a user at the recipient device(s). Modern video conferencing systems use available communication networks including the Internet and are capable of facilitating video conferences between large numbers of participants. Thus, transmitted data is typically compressed and otherwise minimized in order to be able to reduce necessary bandwidth, accommodate as many participants as possible, accommodate advanced features such as multiple streams, and so on. Therefore, captured signals and received signals are processed using various algorithms at the transmitting source and recipient, respectively.

Video (and audio) acquisition takes place at the source device 222 using a capture device such as a digital camera, a webcam, or similar devices. Capabilities of video capture devices may vary significantly. Therefore, the processing of the signal at pre-processing stage 224 may also vary. This stage preceding encoding of the signal to digital signal is aimed at enhancing the acquired video and reducing the complexity of the overall system (for example, for adjusting/optimizing brightness, contrast, noise reduction, scaling, and comparable characteristics).

Encoder 226 at the source and decoder 228 at the recipient encode and decode, respectively, the pre-processed signal using standard or custom algorithms. Post-processing stage 232 is the last stage before the video is displayed to a user at the recipient device and is mainly responsible for enhancing the decoded video signal. Various filtering, adjustment algorithms may be applied at the post-processing stage 232. The post-processed signal is then displayed on a display device 234 (e.g. a desktop monitor, a projector, a portable monitor, etc.).

As mentioned above, various artifacts may be introduced to the video signal due to characteristics and shortcomings of the capture device, encoding methods, transmission medium (e.g. bandwidth), etc. In a system according to embodiments, a sharpness metric may be computed at the post-processing stage and employed along with other metrics to enhance the perceived quality of the displayed video by providing feedback to other components of the system to adjust their operations.

Figure 3:
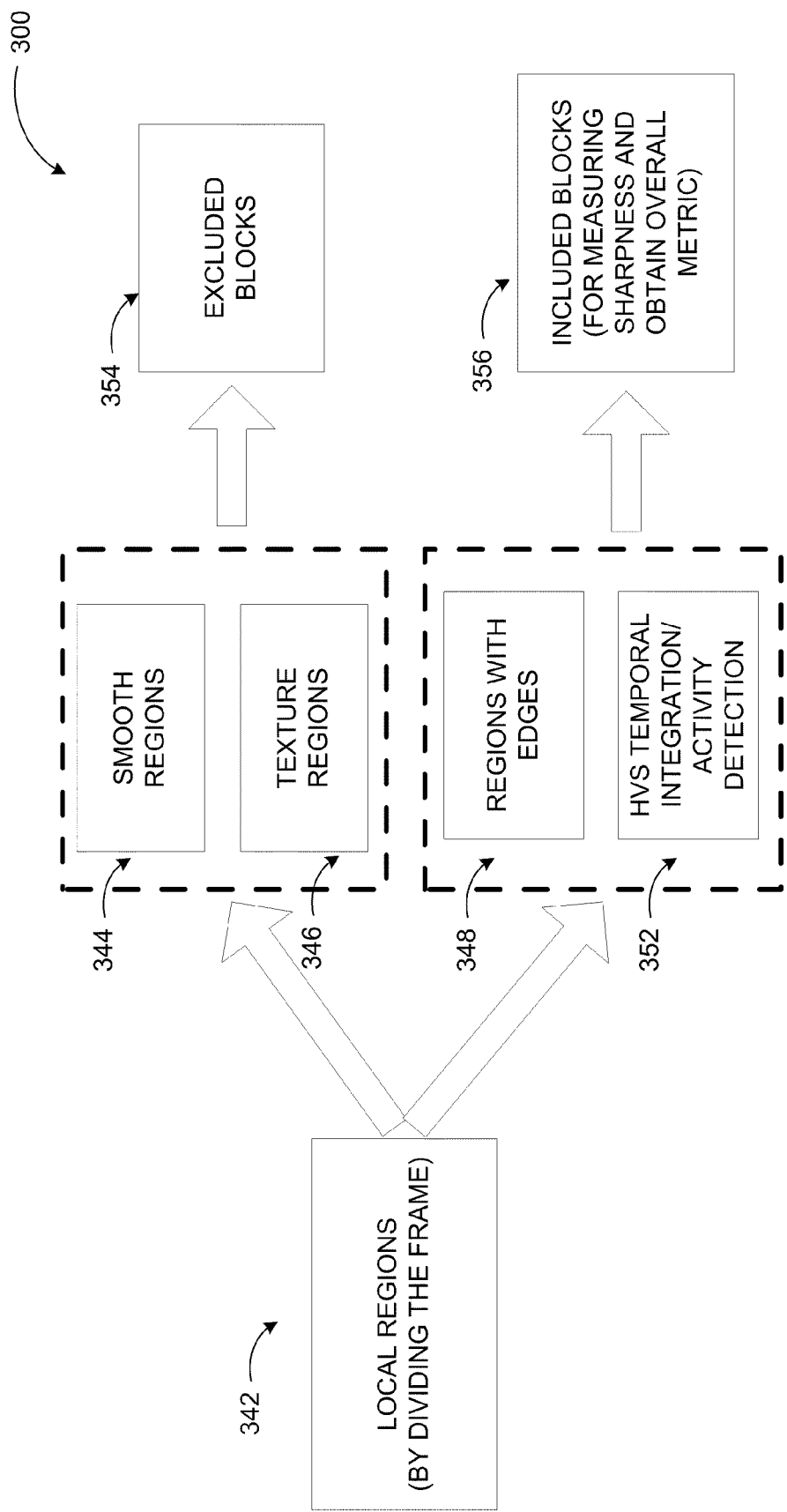
FIG. 3 illustrates how a sharpness metric may be determined excluding some regions according to one embodiment.

FIG. 3 illustrates diagram 300 of how a sharpness metric may be determined excluding some regions according to one embodiment. The sharpness of an image may be measured by how well the edges in the image are defined in spatial domain. In the transformed domain, the difference in high frequency energy associated with edges and fine details define sharpness. A proposed sharpness metric according to embodiments may be used in conjunction with the post-processing phase to adjust filtering strength, combined with other metrics such as a blockiness metric, a jerkiness metric, or a dropped frame number to evaluate the displayed video quality, or adjust other operational parameters to enhance overall video quality.

In a system according to one embodiment, computation of the sharpness metric may begin with determination of local regions 342 by dividing the decoded frame. The regions may be blocks of predefined number of pixels (e.g. 8×8, 16×16, etc.). The computation takes into account characteristics of the local regions 342. For example, smooth regions 344 defined as having pixels with close values do not contain edges and are not affected significantly by the post-processing filtering. Since these smooth regions 344 do not affect the sharpness evaluation of the frame, they may be excluded from the metric calculation reducing computation complexity.

Texture regions 346, where edge orientation is relatively random and pixel value variances are high may also be excluded from sharpness metric computation. Blur tends to be masked in such regions. Thus, texture and smooth regions are grouped together as excluded blocks 354 and left out of the sharpness metric computation.

Regions with edges 348 (not randomly oriented) are used for the computation of the sharpness metric in combination with HVS temporal integration and activity detection 352 yielding blocks included in measuring sharpness (and overall video quality) metric (356). The HVS performs temporal integration, which is equivalent to low-pass filtering. Thus, a motion detection mechanism may be integrated into the computation of the sharpness metric based on the fact higher motion results in less sharp frame perception.

The integration of the information received from various nerves inside the brain is not linear (simple average). It is believed that the information represented in various channels within the primary visual cortex is integrated in the subsequent brain areas. This can be simulated by an exponential model. Thus, once all local sharpness metrics (i.e. sharpness of a certain region in the frame) are obtained, the overall sharpness metric may be determined using the exponential model. This is referred to as pooling.

While embodiments have been discussed above using a general framework, they are intended to provide a general guideline to be used to predict the sharpness of video frames. Specific algorithms for activity detection, local sharpening metric, texture and smooth regions identification may be selected among known algorithms or new ones designed using the principles described herein. Some specific examples are described below.

According to an example scenario, each region may be a block of 8×8 pixels (a size utilized in standard video codecs). As discussed above, each block may be characterized as smooth, edge or, texture block. Smooth and texture blocks may be excluded and only edge blocks employed for the sharpness metric computation. The identification of the blocks may be achieved by obtaining an edge map using the Sobel operator for the whole frame. The Sobel operator is a discrete differentiation operator, computing an approximation of the gradient of the image intensity function. At each point in the image, the result of the Sobel operator is either the corresponding gradient vector or the norm of this vector. The Sobel operator is based on convolving the image with a small, separable, and integer valued filter in horizontal and vertical direction.

In this computation, the number of edge pixels N may be counted for each block. If N is above a predefined threshold, the block is a candidate for edge block. Otherwise it may be categorized as a smooth block. Among the candidate blocks, categories of neighboring blocks may be verified. If all neighboring blocks are edge blocks, the candidate block is a texture block, since the categorization indicates high variation.

The remaining blocks are considered edge blocks, where local sharpness may be estimated using kurtosis. The kurtosis is a statistical measure ($4^{th}$ order moment over $2^{nd}$ order moment) of the peakedness or flatness of a distribution. It is a measure of whether the data has a relatively peak form or flat form compared to a normal distribution. Data sets with high kurtosis tend to have a distinct peak near the mean, decline rapidly following the peak, and have heavy tails. Data sets with low kurtosis tend to have a flat top near the mean rather than a sharp peak. The kurtosis metric may be used in the frequency domain for measuring sharpness. Increasing the image sharpness decreases the kurtosis, while blurring the image increases the kurtosis. Thus, the kurtosis is inversely proportional to the sharpness. To measure the kurtosis per block, the discrete cosine transform (DCT) coefficients are treated as a probability density function (PDF).

Upon determining the local sharpness metric per block, the low-pass temporal effect of the HVS may be incorporated into the computation. This is performed by fetching the motion vector for the corresponding block and computing its length L. This value may be used to weigh the obtained initial local sharpness metric. Then, the overall sharpness metric, which also incorporates HVS characteristics using pooling, may be obtained as:

$$\text{Sharpness} = \left( \sum_{i=1}^{R} |B(i)|^{\beta} \right)^{\frac{1}{\beta}}, \quad [1]$$

where R is the total number of edge blocks in the frame, β is a constant that may be defined experimentally (e.g. 0.4), and B(i) is the local sharpness measure per edge block.

Determination of the overall sharpness metric involves adjusting the obtained sharpness metric to correlate well with the perceived quality. As discussed previously, the Human Visual System does not evaluate quality linearly. Rather, subjective testing may have nonlinear quality rating compression at the extremes. Thus, when quality is very good, the subjective rating may remain practically the same even if sharpness is increased. Moreover, if quality is really bad and the sharpness is decreased, the subjective ratings may not be affected. To replicate the behavior of the HVS, a 'logistic function' may be used as discussed below.

Figure 4:
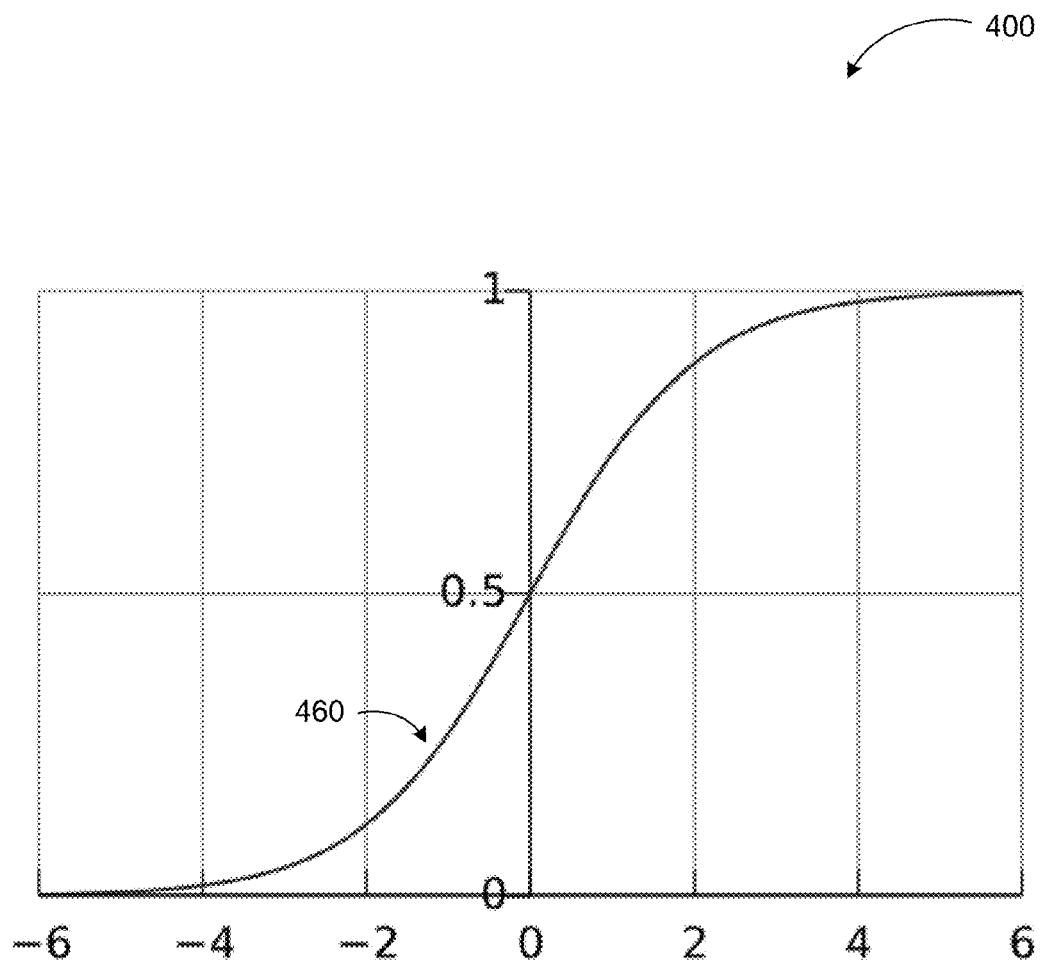
FIG. 4 illustrates an example logistic function that may be used to replicate the behavior of HVS.

FIG. 4 illustrates an example logistic function that may be used to replicate the behavior of HVS. To replicate the behavior of the HVS, which is non-linear, a 'logistic function' may be used. While a number of different non-linear functions may be employed in a system implementing embodiments, an example function 460 is illustrated in diagram 400. Employing the example logistic function 460, a sharpness value between zero and five may be obtained proportional to the sharpness of the video frame. The sharpness metric for this function may be expressed as:

$$\text{Sharpness} = \frac{5}{1 + e^{-300(S-0.002)}}, \quad [2]$$

where S is the initially obtained sharpness metric prior to HSV integration.

Figure 5:
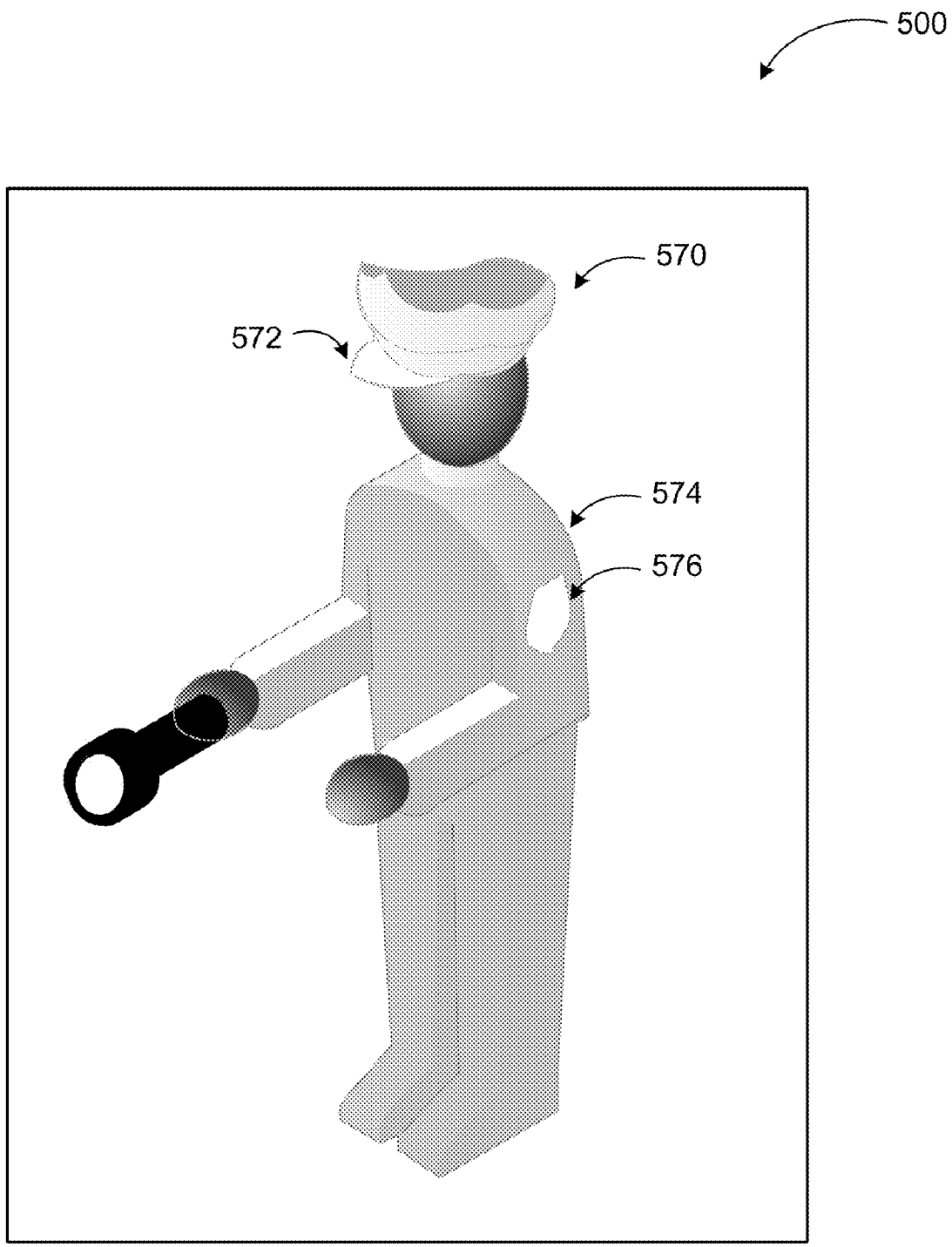
FIG. 5 illustrates an example video frame with blurring effects.

FIG. 5 illustrates an example video frame with blurring effects. As discussed previously, sharpness is perceived along the edges of an image. As shown in the example frame of diagram 500, regions 572, 574, and 576 of the image 570 are not well defined and may be perceived as blurry by the human eye. The sharpness metric for this frame may be a low one (e.g. 2).

Figure 6:
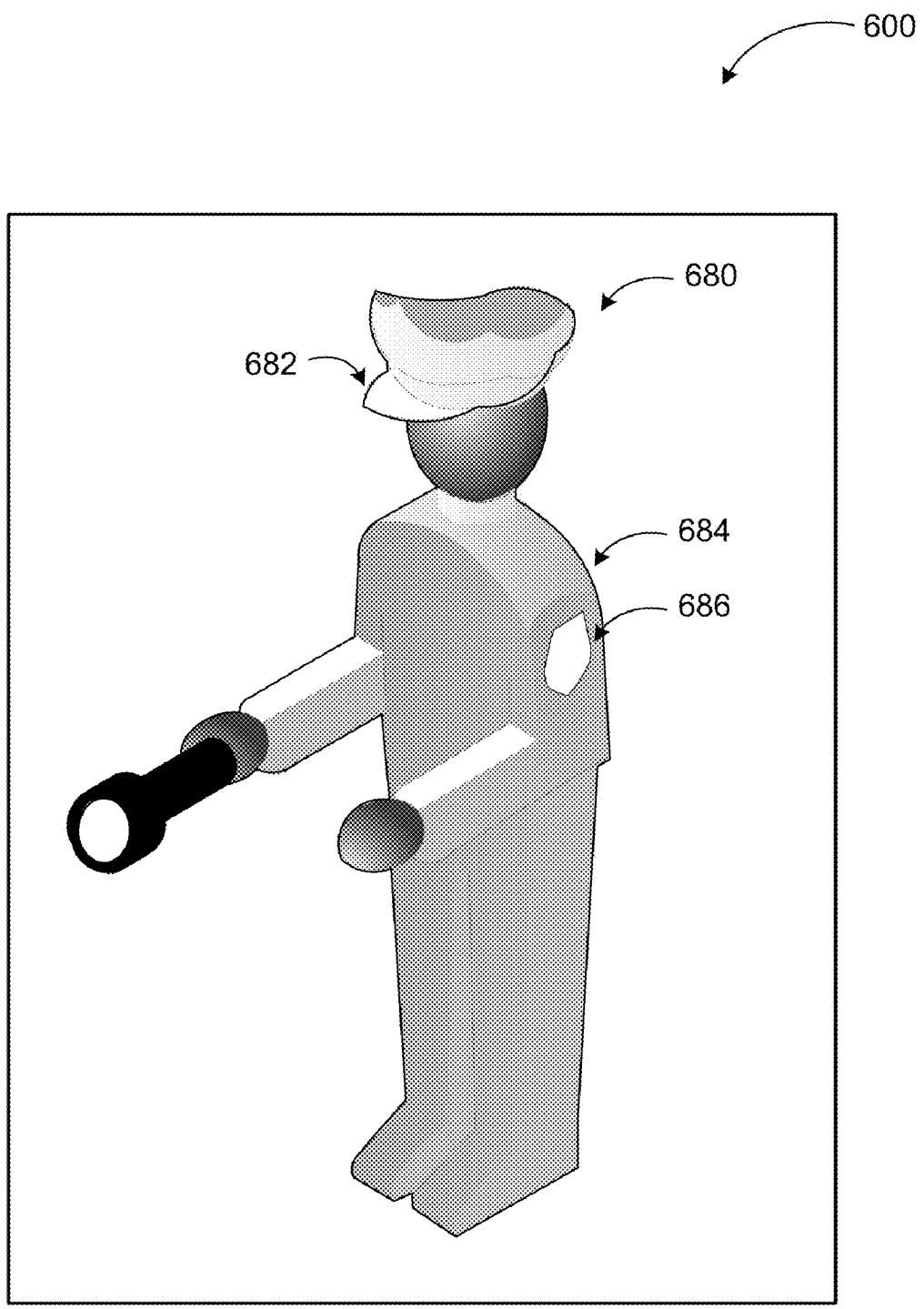
FIG. 6 illustrates the example video frame of FIG. 5 with the blurring effects removed using a sharpness metric according to embodiments.

FIG. 6 illustrates the example video frame of FIG. 5 with the blurring effects removed using a sharpness metric according to embodiments. The quality of the image may be improved by, among other things, decreasing a size of the filter mask or increasing bit rate (i.e. providing more information).

As shown in diagram 600, all three regions of interest (682, 684, and 686) of the image 680 have well defined edges causing a sharper image perception. This example image may be filtered using a 3×3 mask and have a sharpness metric of 5. Thus, the sharpness metric may be used to modify operational parameters such as filtering strength, etc. enabling the system to make quality adjustments objectively and automatically.

While the example systems and frames in FIG. 2 through FIG. 6 have been described with specific components, elements, and graphical aspects, embodiments are not limited to these configurations and can be implemented with other elements and configurations. Furthermore, embodiments are not limited to multi-point video conference systems. Use of a sharpness metric in objectively and automatically enhancing video quality may be employed in any digital video transmission system. Moreover, the formulas listed above for computing sharpness metrics such as the example logistic function are not to be construed as limiting embodiments. Other approaches may be employed to compute a sharpness metric using the principles described herein.

Figure 7:
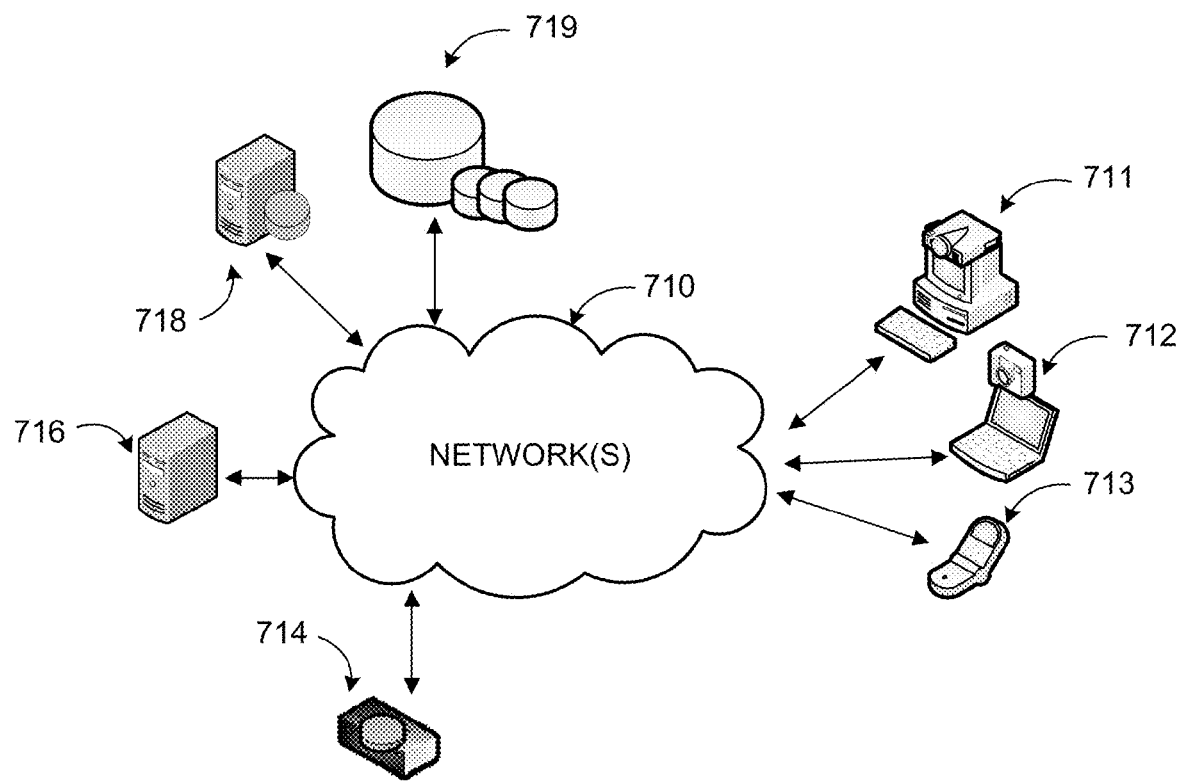
FIG. 7 is a networked environment, where a system according to embodiments may be implemented.

FIG. 7 is an example networked environment, where embodiments may be implemented. A platform providing video conferencing services may be implemented via software executed over one or more servers (e.g. server 716) such as a hosted service. A video conference may also be managed by an MCU (714) as discussed previously. The platform may communicate with video conferencing applications on individual computing devices such as a desktop computer 711, laptop computer 712, and cellular phone 713 ('client devices') through network(s) 710.

As discussed previously, client devices 711-713 are capable of communicating through a variety of modes between subscribers of a communication service. A video conferencing application executed in one of the client devices, one of the servers (e.g. server 716), or the MCU 714 may store and retrieve data associated with the video conference to and from a number of sources such as data store 719, which may be managed by any one of the servers or by database server 718. Quality metrics such as a sharpness metric may then be computed at the receiving client and results employed to enhance video quality for the receiving participant.

Network(s) 710 may comprise any topology of servers, clients, Internet service providers, and communication media. A system according to embodiments may have a static or dynamic topology. Network(s) 710 may include a secure network such as an enterprise network, an unsecure network such as a wireless open network, or the Internet. Network(s) 710 may also comprise a plurality of distinct networks. Network(s) 710 provides communication between the nodes described herein. By way of example, and not limitation, network(s) 710 may include wireless media such as acoustic, RF, infrared and other wireless media.

Many other configurations of computing devices, applications, data sources, and data distribution systems may be employed to implement a video conferencing system employing sharpness metric to enhance video quality. Furthermore, the networked environments discussed in FIG. 7 are for illustration purposes only. Embodiments are not limited to the example applications, modules, or processes.

Figure 8:
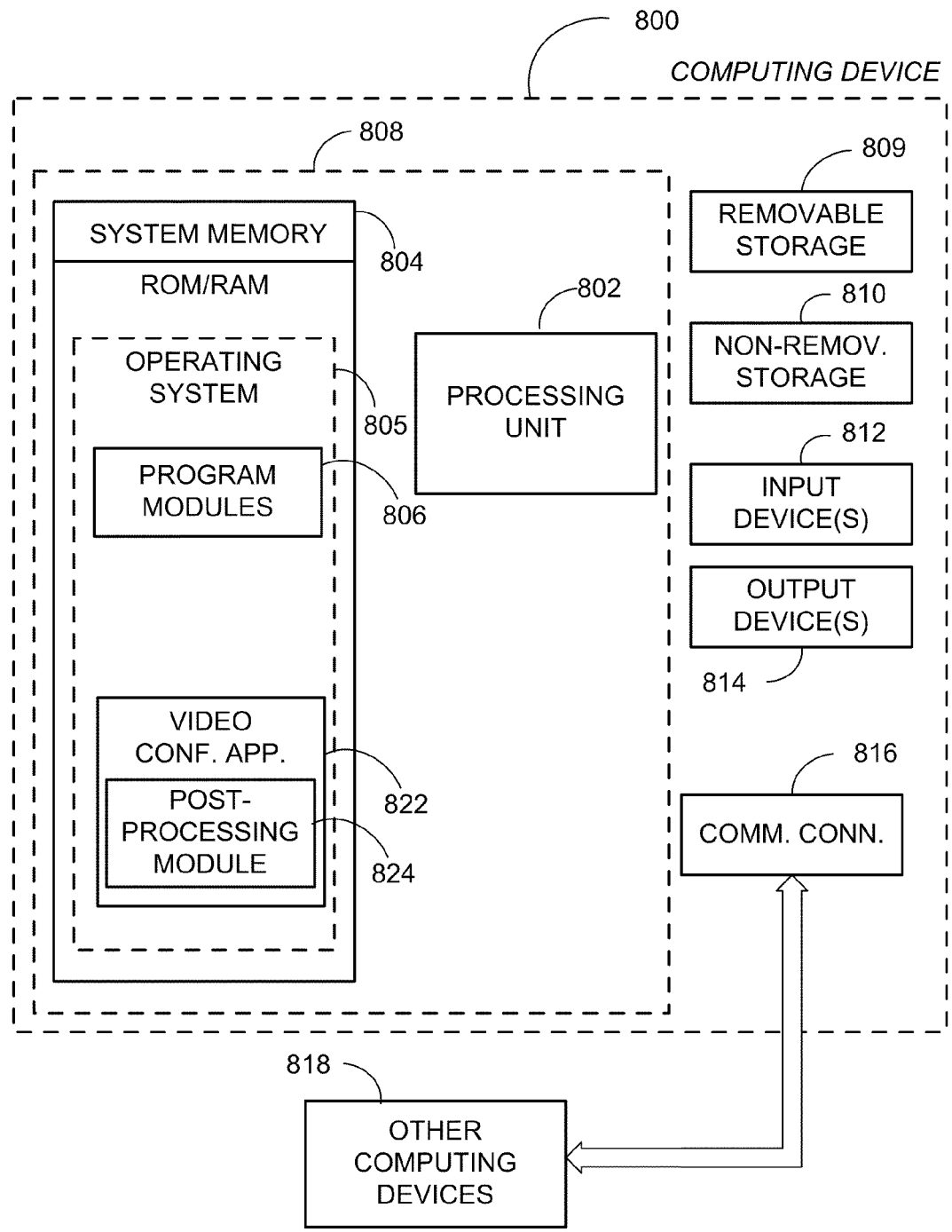
FIG. 8 is a block diagram of an example computing operating environment, where a communication application according to embodiments may be implemented.

FIG. 8 and the associated discussion are intended to provide a brief, general description of a suitable computing environment in which embodiments may be implemented. With reference to FIG. 8, a block diagram of an example computing operating environment for an application according to embodiments is illustrated, such as computer 800. In a basic configuration, computer 800 may include at least one processing unit 802 and system memory 804. Computer 800 may also include a plurality of processing units that cooperate in executing programs. Depending on the exact configuration and type of computing device, the system memory 804 may be volatile (such as RAM), non-volatile (such as ROM, flash memory, etc.) or some combination of the two. System memory 804 typically includes an operating system 805 suitable for controlling the operation of the platform, such as the WINDOWS® operating systems from MICROSOFT CORPORATION of Redmond, Wash. The system memory 804 may also include one or more software applications such as program modules 806, video conferencing application 822, and post-processing module 824.

Video conferencing application 822 and post-processing module 824 may be separate applications or integral modules of a hosted service that provides video conferencing services to client applications/devices. Video conferencing application 822 may transmit and receive video conferencing data including video and audio streams to other participants in the conference. Post-processing module 824 may, among other things, compute a sharpness metric to be used in enhancing received video quality as discussed in more detail above. This basic configuration is illustrated in FIG. 8 by those components within dashed line 808.

Computer 800 may have additional features or functionality. For example, the computer 800 may also include additional data storage devices (removable and/or non-removable) such as, for example, magnetic disks, optical disks, or tape. Such additional storage is illustrated in FIG. 8 by removable storage 809 and non-removable storage 810. Computer readable storage media may include volatile and nonvolatile, removable and non-removable media implemented in any method or technology for storage of information, such as computer readable instructions, data structures, program modules, or other data. System memory 804, removable storage 809 and non-removable storage 810 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computer 800. Any such computer readable storage media may be part of computer 800. Computer 800 may also have input device(s) 812 such as keyboard, mouse, pen, voice input device, touch input device, and comparable input devices. Output device(s) 814 such as a display, speakers, printer, and other types of output devices may also be included. An interactive display may act both as an input device and output device. These devices are well known in the art and need not be discussed at length here.

Computer 800 may also contain communication connections 816 that allow the device to communicate with other devices 818, such as over a wireless network in a distributed computing environment, a satellite link, a cellular link, and comparable mechanisms. Other devices 818 may include computer device(s) that execute communication applications such as video conferencing applications and so on. Communication connection(s) 816 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 9:
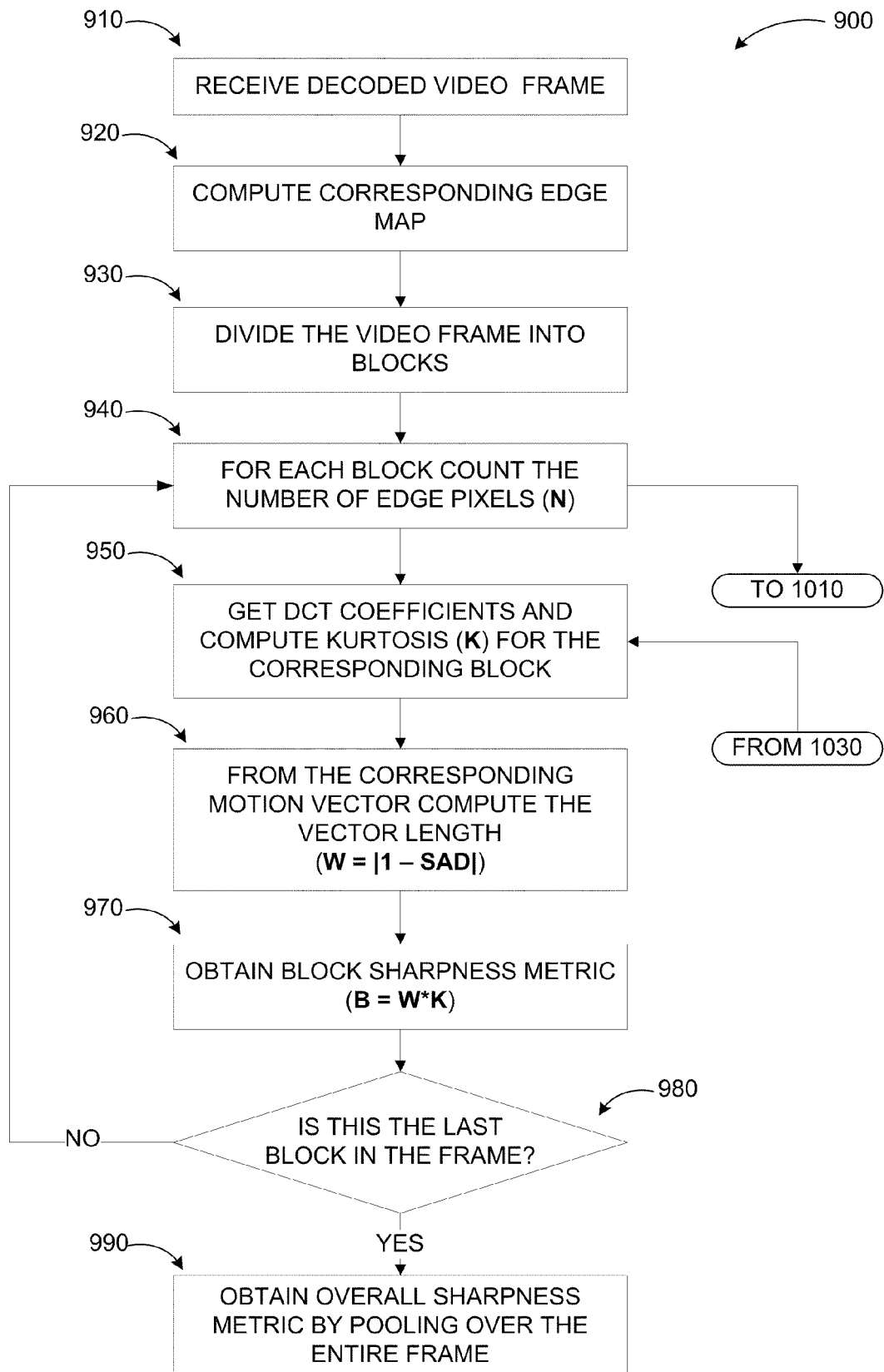
FIG. 9 and FIG. 10 illustrate a logic flow diagram for a process of determining a sharpness metric according to embodiments.
Figure 10:
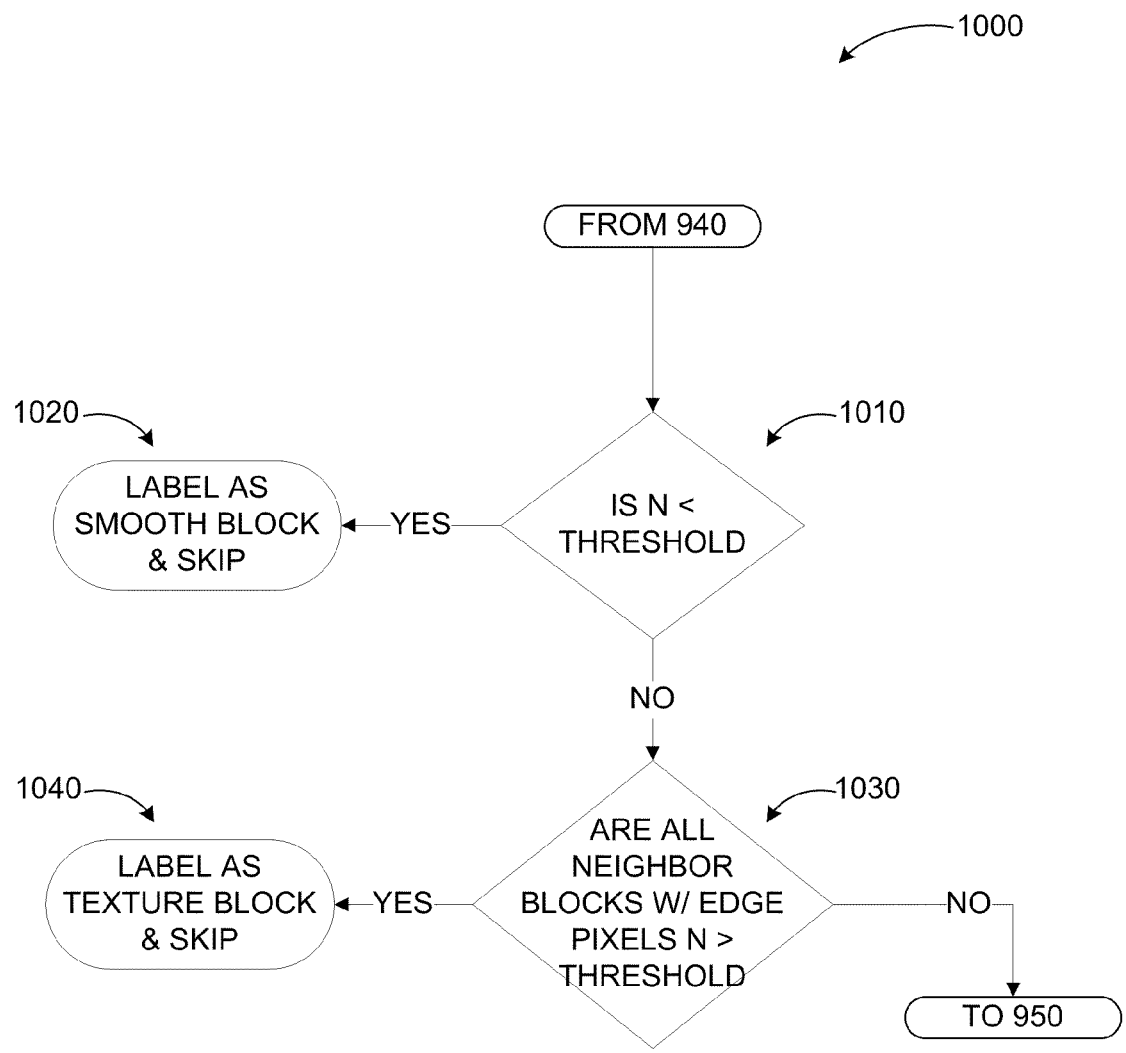

FIG. 9 and FIG. 10 illustrate a logic flow diagram for a process 900 (and its subprocess 1000) of determining a sharpness metric according to embodiments. Process 900 may be implemented by any video conferencing application such as the ones described above.

Process 900 begins with operation 910, where the decoded frame is received at the post-processing stage. At operation 920, an edge map corresponding to the decoded frame is computed as discussed previously. Subsequently, the video frame is divided into blocks at operation 930.

Upon dividing the frame into blocks, an iterative process is performed between operations 940 and 980 computing block sharpness metrics for each block and categorizing the blocks prior to the computation as shown in sub-process 1000 of FIG. 10. In the iterative process, a number of edge pixels are counted or each block at operation 940. In the sub-process 1000 between operations 940 and 950, edge blocks are identified and smooth and texture blocks are excluded.

At operation 950, DCT coefficients for the edge blocks are obtained and kurtosis (K) for each block computed. This is followed by the computation of the vector length of each corresponding motion vector (W=|1−SAD|) at operation 960. From the vector length and kurtosis, block sharpness metric B can be determined as B=W*K at operation 970. This computation is repeated until the last block of the frame is determined at decision operation 980.

Upon completion of the individual block metric computations, the overall sharpness metric is computed at operation 990 by pooling over the entire decoded frame. A non-linear logistic function is applied to the overall sharpness metric such that extreme values of the metric are suppressed replicating a behavior of the HVS. The sharpness metric may then be used to instruct components of the system to modify operational parameters or combined with other metrics to obtain an overall video quality metric.

Sub-process 1000, illustrated in FIG. 10, follows operation 940 of process 900. A determination is made at decision operation 1010 whether the number of edge pixels, N, in the current block is less than a predefined threshold. If N is less than the threshold, the block is labeled as a smooth label at operation 1020 and excluded from further metric computation. If the determination is negative at operation 1010, another determination is made at decision operation 1030 whether all neighboring blocks have edge pixel numbers larger than the predefined threshold. If that is the case, the current block is labeled as a texture block at operation 1040 and excluded from further metric computation. If not all neighbor blocks have edge pixel numbers exceeding the threshold, the block is determined to be an edge block and processing returns to operation 950 of process 900 for computation of the block sharpness metric on the current block.

The operations included in processes 900 and 1000 are for illustration purposes. Providing a sharpness metric in video conferencing applications may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for providing a sharpness metric associated with received video quality in a video conference system, the method comprising:
   receiving a decoded video frame at a post-processing module;
   dividing the frame into blocks;
   determining edge blocks by:
      determining a number of edge pixels in each block;
      if the number of edge pixels in a block is below a predefined threshold, designating the block a smooth block;
      if the number of edge pixels in another block exceeds the predefined threshold, determining numbers of edge pixels in neighboring blocks of the other block, and
      if the numbers of edge pixels in all neighboring blocks exceed the predefined threshold, designating the other block a texture block, else
      designating the other block an edge block;
   computing local sharpness metrics for each of the edge blocks based on a kurtosis and a motion vector for each respective edge block; and
   computing an overall sharpness metric for the frame by pooling the local sharpness metrics over the entire frame.

2. The method of claim 1, wherein the smooth blocks and the texture blocks of the frame are excluded from the overall sharpness metric computation.

3. The method of claim 1, further comprising:
   computing an edge map of the frame employing Sobel operator.

4. The method of claim 1, wherein the local sharpness metric for each block is computed by:
   determining discrete cosine transform (DCT) coefficients and the kurtosis for each block, wherein the DCT coefficients are handled as a probability density function;
   determining a motion vector length for each block; and
   computing the local sharpness metric by multiplying the kurtosis and the motion vector length for each block.

5. The method of claim 1, wherein pooling the local sharpness metrics over the entire frame includes summing the local sharpness metrics of the frame by applying a non-linear model to replicate Human Visual System (HVS).

6. The method of claim 5, wherein the non-linear model is an exponential model and defines an upper and a lower limit for the overall sharpness metric.

7. The method of claim 1, further comprising:
employing the overall sharpness metric to adjust at least one operational parameter of the video conference system for automatically reducing blockiness artifacts in received video.

8. The method of claim 1, further comprising:
combining the overall sharpness metric with at least one from a set of a blockiness metric, a jerkiness metric, and a dropped frame number to adjust at least one operational parameter of the video conference system for automatically enhancing received video quality.

9. The method of claim 8, wherein the at least one operational parameter is adjusted at one of: a pre-processing module, an encoder, a decoder, and the post-processing module of the video conference system.

10. A computing device capable of providing video conferencing services, the computing device comprising:
a video capture device;
a pre-processing module;
an encoder;
a decoder;
a post-processing module configured to:
receive a decoded video frame;
divide the frame into blocks;
determine smooth, texture, and edge blocks;
exclude smooth and texture blocks;
compute local sharpness metrics for each of the edge blocks employing an activity detection algorithm; and
compute an overall sharpness metric for the frame by pooling the local sharpness metrics over the entire frame, wherein the overall sharpness metric is used to adjust at least one operational parameter of the video conference system for automatically enhance received video; and
a display device for displaying the enhanced video.

11. The computing device of claim 10, wherein the post-processing module is further configured to determine the edge blocks by:
determining an edge map corresponding to the frame;
determining a number of edge pixels in each of the blocks; and
designating the smooth, texture, and edge blocks based on a number of the edge pixels in each of the blocks and in neighboring blocks.

12. The computing device of claim 10, wherein the post-processing module is further configured to compute the local sharpness metric for each block by:
compute a kurtosis "K" for each edge block based on DCT coefficients for each edge block;
compute a motion vector length "W" for each edge block based on W=|1−SAD|, where SAD represents a sum of absolute differences; and
compute the local sharpness metric "B" by multiplying the kurtosis and the motion vector length for each block as B =W*K.

13. The computing device of claim 10, wherein pooling the local sharpness metrics over the entire frame includes applying a non-linear logistic function to a combination of the local sharpness metrics of the edge blocks within the frame such that extreme values of overall sharpness metric are suppressed.

14. The computing device claim 10, wherein the overall sharpness metric is employed to perform one of:
instruct the encoder to increase a transmit bit rate in response to the metric being below a predefined threshold; and
instruct the post-processing module to one of increase a filtering strength and decrease a filter mask size in response to the metric being below the predefined threshold.

15. The computing device of claim 10, wherein a Multipoint Control Unit (MCU) of the video conference system is employed to receive the overall sharpness metric from a receiving participant and instruct a transmitting participant to adjust the at least one operational parameter for enhancing the received video.

16. A computer-readable memory device having instructions stored thereon for providing video conferencing services the instructions comprising:
receiving a decoded video frame at a post-processing module;
dividing the frame into blocks;
determining edge blocks by excluding smooth and texture blocks based on a number of the edge pixels in each of the blocks and in neighboring blocks;
computing local sharpness metrics for each of the edge blocks based on a product of a kurtosis and a motion vector for each respective edge block;
computing an overall sharpness metric for the frame by pooling the local sharpness metrics over the entire frame and applying an exponential logistic function; and
combining the overall sharpness metric with at least one from a set of: a blockiness metric, a jerkiness metric, and a dropped frame number to adjust at least one operational parameter of the video conference system for automatically enhancing received video quality.

17. The computer-readable memory device of claim 16, wherein the overall sharpness metric "S" is computed as:

$$S = \left( \sum_{i=1}^{R} |B(i)|^\beta \right)^{\frac{1}{\beta}},$$

where "R" is a total number of edge blocks within the frame, B(i) represents the local sharpness metric for each edge block, and β is a predefined constant.

18. The computer-readable memory device of claim 16, wherein the non-linear logistic function is applied to the overall sharpness metric "S'" as:

$$S' = \frac{5}{1 + e^{-300(S-0.002)}},$$

where S' is the adjusted overall sharpness metric, and numerator "5" provides an upper limit value of five to the overall sharpness metric.

19. The computer-readable memory device of claim 16, wherein the instructions further comprise:
decreasing a filter size mask automatically in response to the overall sharpness metric being below a predetermined threshold.

* * * * *